(12) United States Patent
Lin

(10) Patent No.: US 11,444,997 B2
(45) Date of Patent: *Sep. 13, 2022

(54) METHODS FOR DICTIONARY-BASED COMPRESSION AND DEVICES THEREOF

(71) Applicant: NetApp, Inc., San Jose, CA (US)

(72) Inventor: Xing Lin, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,437

(22) Filed: Sep. 10, 2021

(65) Prior Publication Data
US 2021/0409467 A1   Dec. 30, 2021

Related U.S. Application Data

(63) Continuation of application No. 16/821,328, filed on Mar. 17, 2020, now Pat. No. 11,122,095.

(Continued)

(51) Int. Cl.
*H04L 69/04* (2022.01)
*H04L 65/61* (2022.01)
(Continued)

(52) U.S. Cl.
CPC .......... *H04L 65/61* (2022.05); *H04L 41/147* (2013.01); *H04L 41/16* (2013.01); *H04L 65/65* (2022.05);
(Continued)

(58) Field of Classification Search
CPC ... H04L 41/147; H04L 41/16; H04L 65/4069; H04L 65/608; H04L 29/0604;
(Continued)

(56) References Cited

U.S. PATENT DOCUMENTS 5,253,325 A   10/1993  Clark
5,410,671 A *  4/1995  Elgamal ................ G06T 9/005
                                                711/202

(Continued)

FOREIGN PATENT DOCUMENTS

CN   103281156 B   6/2017
CN   107528828 A   12/2017

(Continued)

*Primary Examiner* — Le H Luu
(74) *Attorney, Agent, or Firm* — Troutman Pepper Hamilton Sanders LLP

(57) ABSTRACT

Methods, non-transitory machine readable media, and computing devices that provide improved dictionary-based compression are disclosed. With this technology, a first portion of an input data stream is compressed using a first dictionary. A second dictionary is trained when the first dictionary is determined to be stale. The dictionary can be determined to be stale based on a size of the input data stream compressed using the first dictionary or a compression ratio decreasing by a threshold, for example. The first dictionary can be stored with metadata associated with the compressed first portion of the input data stream. Accordingly, this technology improves compression ratios, eliminates the need for reference counting, and facilitates improved reclamation of orphan dictionaries, among other advantages.

20 Claims, 6 Drawing Sheets

Related U.S. Application Data

(60) Provisional application No. 62/904,425, filed on Sep. 23, 2019.

(51) Int. Cl.

| | | |
|---|---|---|
| *H04L 41/147* | (2022.01) | |
| *H04L 41/16* | (2022.01) | |
| *H04N 1/64* | (2006.01) | |
| *H04N 19/103* | (2014.01) | |
| *H04N 1/32* | (2006.01) | |
| *H04N 19/42* | (2014.01) | |
| *H04N 19/70* | (2014.01) | |
| *H04N 19/00* | (2014.01) | |
| *H04L 65/65* | (2022.01) | |
| *H04L 67/565* | (2022.01) | |
| *H04L 67/5651* | (2022.01) | |

(52) U.S. Cl.
CPC ........ *H04L 67/565* (2022.05); *H04L 67/5651* (2022.05); *H04L 69/04* (2013.01); *H04N 1/32277* (2013.01); *H04N 1/64* (2013.01); *H04N 1/648* (2013.01); *H04N 19/00* (2013.01); *H04N 19/103* (2014.11); *H04N 19/42* (2014.11); *H04N 19/70* (2014.11)

(58) Field of Classification Search
CPC ........ H04L 29/08783; H04L 29/08792; H04N 19/00; H04N 19/103; H04N 19/42; H04N 19/70; H04N 1/64; H04N 1/648; H04N 1/32277; A61K 31/7048; G06F 16/214; G07F 5/18; H03M 7/3084; H03M 7/3086; H03M 7/3088; H03M 7/6052; H03M 7/6064
See application file for complete search history.

(56) References Cited

U.S. PATENT DOCUMENTS

| | | | |
|---|---|---|---|
| 5,604,495 A * | 2/1997 | Watanabe | H03M 7/46 341/51 |
| 5,646,617 A * | 7/1997 | Ohmoto | H03M 7/3088 341/51 |
| 5,680,601 A | 10/1997 | Rust | |
| 5,872,530 A * | 2/1999 | Domyo | H03M 7/3088 341/106 |
| 5,951,623 A | 9/1999 | Reynar et al. | |
| 6,529,912 B2 | 3/2003 | Satoh et al. | |
| 6,667,699 B2 | 12/2003 | Jones et al. | |
| 7,860,843 B2 | 12/2010 | Dodd et al. | |
| 10,187,081 B1 * | 1/2019 | Diamant | H03M 7/3088 |
| 2003/0097474 A1 * | 5/2003 | Defosse | G07F 9/002 709/246 |
| 2009/0006510 A1 * | 1/2009 | Laker | H03M 7/3086 708/203 |
| 2009/0204626 A1 * | 8/2009 | Mustafa | A61K 31/7048 382/253 |
| 2016/0006456 A1 * | 1/2016 | Muramatsu | H03M 7/40 707/693 |
| 2017/0288694 A1 * | 10/2017 | Kataoka | H03M 7/6064 |
| 2018/0137114 A1 * | 5/2018 | Barbas | G06F 16/214 |
| 2019/0155925 A1 * | 5/2019 | Giannikis | G06F 16/213 |
| 2020/0344644 A1 * | 10/2020 | Liu | H04W 28/06 |

FOREIGN PATENT DOCUMENTS

| | | |
|---|---|---|
| CN | 107645538 A | 1/2018 |
| CN | 106815876 B | 8/2019 |
| JP | H05152971 A | 6/1993 |
| JP | 3058931 B2 | 7/2000 |
| WO | WO-2011105463 A1 | 9/2011 |

* cited by examiner

METHODS FOR DICTIONARY-BASED COMPRESSION AND DEVICES THEREOF

This is a continuation application of U.S. application Ser. No. 16/821,328, filed Mar. 17, 2020, which claims the benefit of U.S. Provisional Patent Application Ser. No. 62/904,425, filed Sep. 23, 2019, which is hereby incorporated by reference in its entirety.

FIELD

This technology generally relates to data storage and, more particularly, to methods and devices for improved dictionary-based compression of input data streams that increase compression ratios and improve storage utilization.

BACKGROUND

Traditional data compressors replace repeated strings in an input data stream by an offset and length within a look-back window. Frequently appearing strings are inserted into a dictionary and the dictionary is queried for each new string. Typically, a compressor starts compression with an empty dictionary. As more data is compressed, the dictionary is increasingly populated and becomes more effective in detecting repeated strings.

Newer compressors have been developed in which a dictionary is trained using a set of sample data and the dictionary is subsequently used to compress new data. These newer compressors can yield improved compression ratios, particularly when compressing small data sets for which limited historical data is available from which to construct a dictionary. However, the new data may differ significantly from the sample data, and dictionaries trained based on the sample data may therefore become stale and ineffective at compressing the new data.

When data blocks are compressed using the trained dictionary, a reference count mechanism or a similar approach, such as mark and sweep, is generally used to keep track of the number of compressed blocks using a particular dictionary. A dictionary should not be removed, when there exists data blocks compressed using that dictionary. However, reference counting adds complexity to the storage system and requires a significant amount of overhead. Accordingly, current data compression techniques are resource-intensive and often degrade in effectiveness over time.

DETAILED DESCRIPTION

Figure 1:
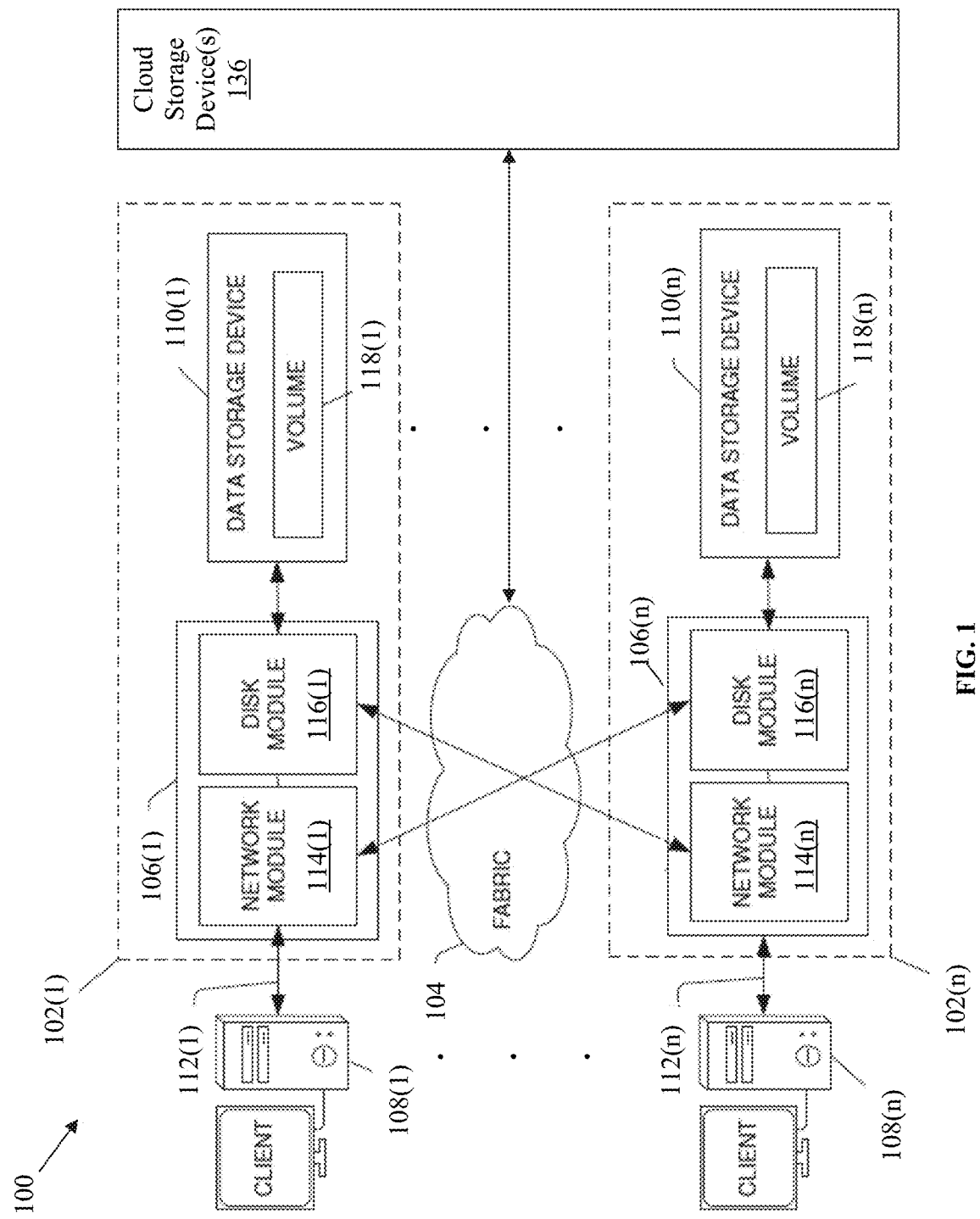
FIG. 1 is a block diagram of a network environment with exemplary data storage apparatuses.

A clustered network environment 100 that may implement one or more aspects of the technology described and illustrated herein is shown in FIG. 1. The clustered network environment 100 includes data storage apparatuses 102(1)-102(n) that are coupled over a data fabric 104 that includes communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and computing devices that improve dictionary-based data compression by dynamically retraining stale dictionaries and storing dictionaries in containers along with the data compressed using the dictionaries to thereby eliminate the need for reference counting. The improved compression of this technology allows computing device to utilize fewer storage resources to store more data. Additionally, eliminating reference counting reduced the computation burden currently required to facilitate dictionary-based compression.

Node computing devices 106(1)-106(n) can be primary or local storage controllers or secondary or remote storage controllers that provide client devices 108(1)-108(n) with access to data stored within data storage devices 110(1)-110(n) and cloud storage device(s) 136. The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may run applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations and/or cloud storage (e.g., a storage endpoint may be stored within cloud storage device(s) 136), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, solid state drives (SSDs), flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
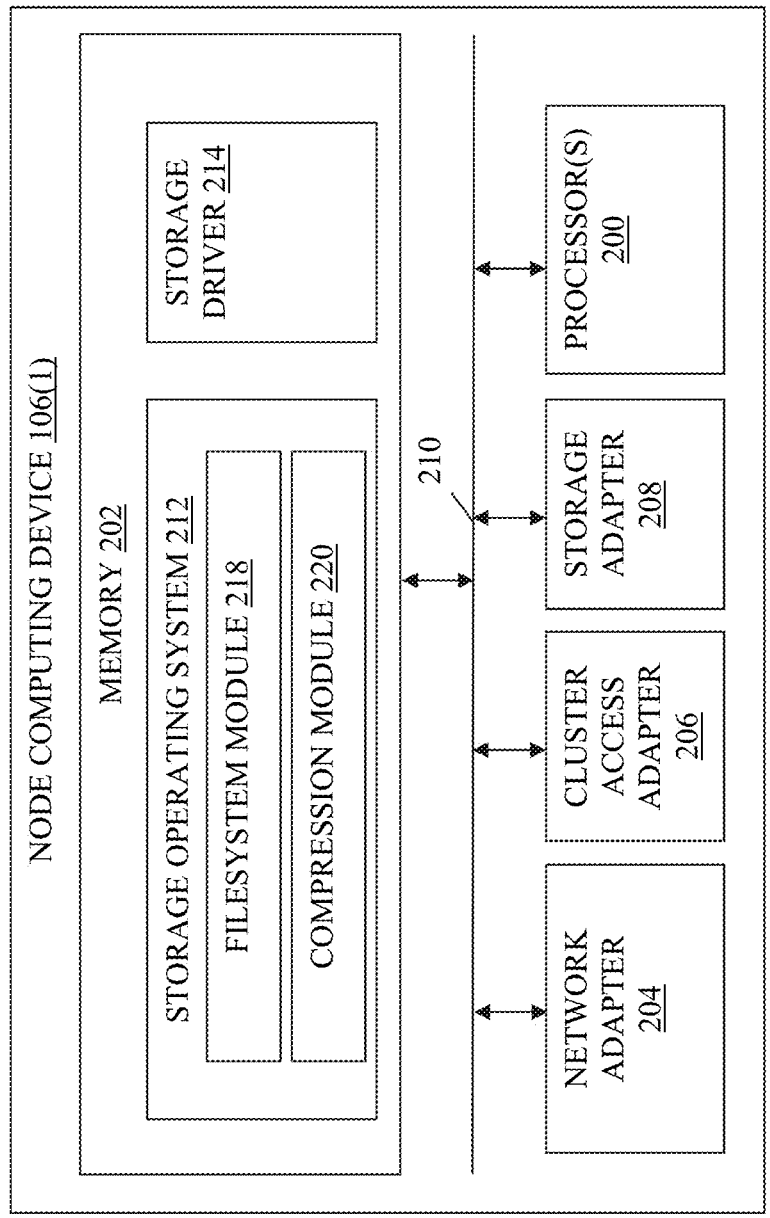
FIG. 2 is a block diagram of an exemplary node computing device of one of the data storage apparatuses of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) (not shown) with cloud storage device(s) 136 to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol. The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the data fabric 104. In some examples, a storage driver 214 in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to the data fabric 104. Thus, the node computing device 106(1) can respond to client device requests to manage data on one of the data storage devices 110(1)-110(n) or cloud storage device(s) 136 (e.g., or additional clustered devices) in accordance with the client device requests.

The file system module 218 of the storage operating system 212 can establish and manage one or more file systems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a compression module 220 configured to compress ingested input data streams using dictionaries. The compression module 220 trains a dictionary using an initial portion of an input data stream or a sample data set and compresses subsequent portions of the input data stream using the dictionary until the dictionary is determined to be stale or ineffective. The compression module 220 can determine that the dictionary is stale based on use of the dictionary to compress a threshold size of the input data stream. Alternatively, the dictionary can be determined to be stale when a compression ratio of a current compressed portion is lower by a threshold than that of a previously compressed portion (e.g., immediately preceding or initial portion).

When the dictionary is stale or ineffective, or at other times (e.g., and a size of data corresponding to a container size has been compressed and the end of the container has therefore been reached), the dictionary is stored with metadata in a same container as the portion(s) of the input data streams that were compressed using the dictionary. The operation of the compression module is described and illustrated in more detail later, including with reference to FIGS. 3-5.

The examples of the technology described and illustrated herein may be embodied as one or more non-transitory computer or machine readable media, such as the memory 202, having machine or processor-executable instructions stored thereon for one or more aspects of the present technology, which when executed by processor(s), such as processor(s) 200, cause the processor(s) to carry out the steps necessary to implement the methods of this technology, as described and illustrated by way of the examples herein. In some examples, the executable instructions are configured to perform one or more steps of a method, such as one or more of the exemplary methods described and illustrated later with reference to FIGS. 3-5, for example.

Figure 3:
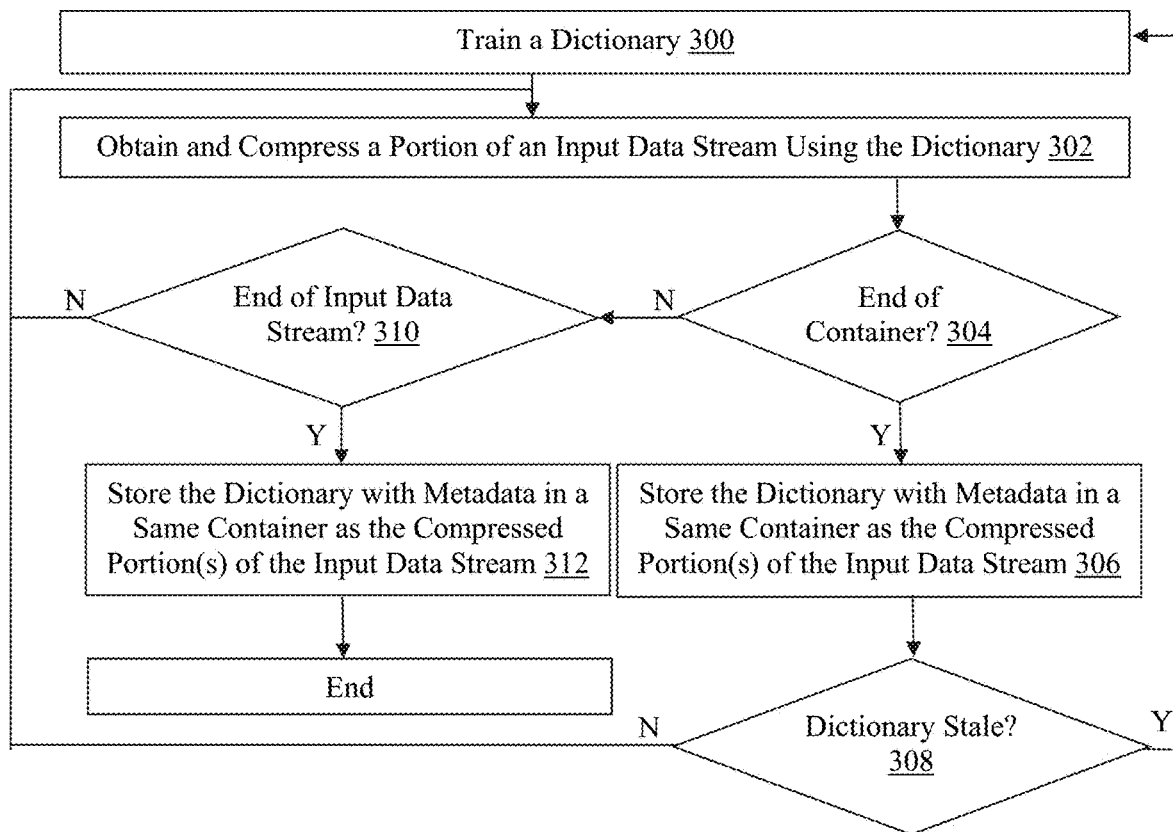
FIG. 3 is a flowchart of an exemplary method for dynamic dictionary retraining for dictionary-based data compression.

Referring more specifically to FIG. 3, a flowchart of an exemplary method for dynamic dictionary retraining for dictionary-based data compression is illustrated. In step 300 in this example, the node computing device 106(1) trains a dictionary to be used to compress an input data stream or a portion thereof. In some examples, the input data stream relates to data received from one of the client devices 108(1)-108(n) to be stored on the data storage devices 110(1)-110(n) or the cloud storage device(s) 136, and/or data to be stored as a backup copy on the cloud storage device(s) 136, for example, although other types of input data streams can also be used.

The dictionary can be trained using a portion of the input data stream to be compressed (e.g., an initial portion in a first iteration) and/or a sample data set, for example, and other data sources for training the dictionary can also be used. In one example, the dictionary can be constructed as described in Liao, et al., "Effective construction of relative lempelziv dictionaries," Proceedings of the 25th International Conference on World Wide Web, 2016, which is incorporated by reference herein in its entirety. Other methods for training the dictionary can also be used in other examples.

In step 302, the node computing device 106(1) obtains and compresses a portion of the input data stream using the dictionary trained in step 300. Optionally, the compression technology described and illustrated herein can be used in combination with one or more deduplication techniques to further optimize the resources utilized for data storage. Accordingly, the input data stream, or one or more potions thereof, is chunked, hashed, and/or deduplicated before it is compressed in step 302 in some examples.

In step 304, the node computing device 106(1) determines whether the end of a particular container has been reached. In this example, the storage operating system 212 uses container-based data grouping to store data in fixed size containers. In the container-based data grouping, relatively small data blocks are grouped into larger containers. The metadata for each data block within the container is stored in the metadata section of the container. Compressing in larger amounts of data can lead to higher compression ratios than compressing in smaller amounts of data. Additionally, indexing overhead (e.g., memory space) can be significantly reduced since indexing can be carried out at the container level instead of for each individual block.

Many flash systems group and write new data to SSDs in containers referred to as erase blocks to prolong the SSD lifetime. At the device level, Zoned Namespace (ZNS) SSDs and Shingle Magnetic Recording Drives (SMR) only support sequential writes to a zone. Issuing relatively large sequential requests associated with a container to such a device can reduce the processing overhead at the device controller and improve the performance. Other types of containers can also be used in other examples.

If the node computing device 106(1) determines in step 304 that the end of the container has not been reached, then the No branch is taken back to step 302, and the node computing device 106(1) continues obtaining and compressing portions of the input data stream. Unless the portion of the input data stream compressed in step 302 is the same size as the container, the No branch will be taken in a first iteration. However, if the node computing device 106(1) subsequently determines in step 304 that the end of a container has been reached, then the Yes branch is taken to step 306.

In step 306, the node computing device 106(1) stores the dictionary trained in step 300 with metadata in a same container as the portion(s) of the input data stream that were compressed using the dictionary in step 302. Accordingly, this technology transparently integrates dictionary-based compression into storage systems using container-based data grouping. The dictionaries are stored in this example along with the metadata in a container. A dictionary used to compress data for a container may be stored next to the metadata of the same container.

During data retrieval, the dictionaries are read after the metadata and are used for decompression. In this way, each container is independent. As long as the container exists, the data within it can be decompressed and recovered. Associating many smaller compressed input stream portions with a same container allows the node computing device 106(1) to store in the container only one copy of the dictionary used to compress the smaller input stream portions, and thereby effectively amortize the overhead of the dictionary storage while eliminating the need for reference counting.

In particular, the overhead is amortized and reduced as compared to storing a copy of a dictionary together with each compressed input stream portion. Additionally, the need for reference counting is eliminated because each container stores a copy of the dictionary that is used to compress portion(s) of the input data stream that were compressed using the dictionary. Accordingly, a dictionary can be deleted when all of the associated input data stream portion(s) associated with the container have been deleted irrespective of, and without using a reference count to determine, whether any other input stream portions have been compressed using the dictionary.

Furthermore, existing garbage collection mechanisms can be re-used to reclaim orphan dictionaries at the same time as invalid data is reclaimed. Accordingly, this technology enables the re-use of existing garbage collection mechanisms to manage both invalid data and orphan dictionaries, greatly simplifying the storage system architecture. Subsequent to storing the dictionary, the node computing device 106(1) proceeds to step 308.

In step 308, the node computing device 106(1) determines whether the dictionary is stale. In one example, the dictionary is determined to be stale when a threshold size of the input data stream has been compressed, as described and illustrated in more detail later with reference to FIG. 5. In other examples, the dictionary is determined to be stale based on a comparison of a compression ratio of a current portion of the input data stream to a compression ratio of another portion of the input data stream that was previously compressed with the same dictionary, as described and illustrated in more detail later with reference to FIG. 4. Other methods for determining whether the dictionary trained in step 300 is stale can also be used.

If the node computing device 106(1) determines that the dictionary is not stale, then the No branch is taken back to step 302, and another portion of the input data stream is obtained, compressed, and stored in a new container, as described and illustrated in more detail earlier. However, if the node computing device 106(1) determines in step 308 that the dictionary is stale, then the Yes branch is taken back to step 300 and the node computing device 106(1) trains a new dictionary, optionally using another current portion of the input data stream.

Referring back to step 304, if the node computing device 106(1) determines that the end of the container has not been reached, then the No branch is taken to step 310. In step 310, the node computing device 106(1) determines whether the end of the input data stream has been reached. If the node computing device 106(1) determines that the end of the input data stream has not been reached, then the No branch is taken back to step 302, and another portion of the input data stream is obtained and compressed as described and illustrated in more detail earlier.

However, if the node computing device 106(1) determines in step 310 that the end of the input data stream has been reached, then the Yes branch is taken to step 312, and the dictionary is stored with metadata in the same container as the portion(s) of the input data stream that were compressed using the dictionary, as described and illustrated in more detail earlier with reference to step 306. In this iteration, since the end of the input data stream has been reached, the method ends subsequent to storing the container that includes the dictionary and associated compressed portion(s) of the input data stream.

While the condition regarding whether the dictionary is stale is tested in step 308 in this example subsequent to determining that the end of a container has been reached in step 304, the determination in step 308 can be performed at other times in other examples, including prior to the node computing device 106(1) reaching the end of a container. In these examples, the container can be stored following a determination that the dictionary is stale or multiple dictionaries can be stored in one or more of the containers, and other permutations can also be used. Additionally, in other examples, one or more of steps 300-312 can be performed in parallel for any number of input data streams and/or in a different order.

Figure 4:
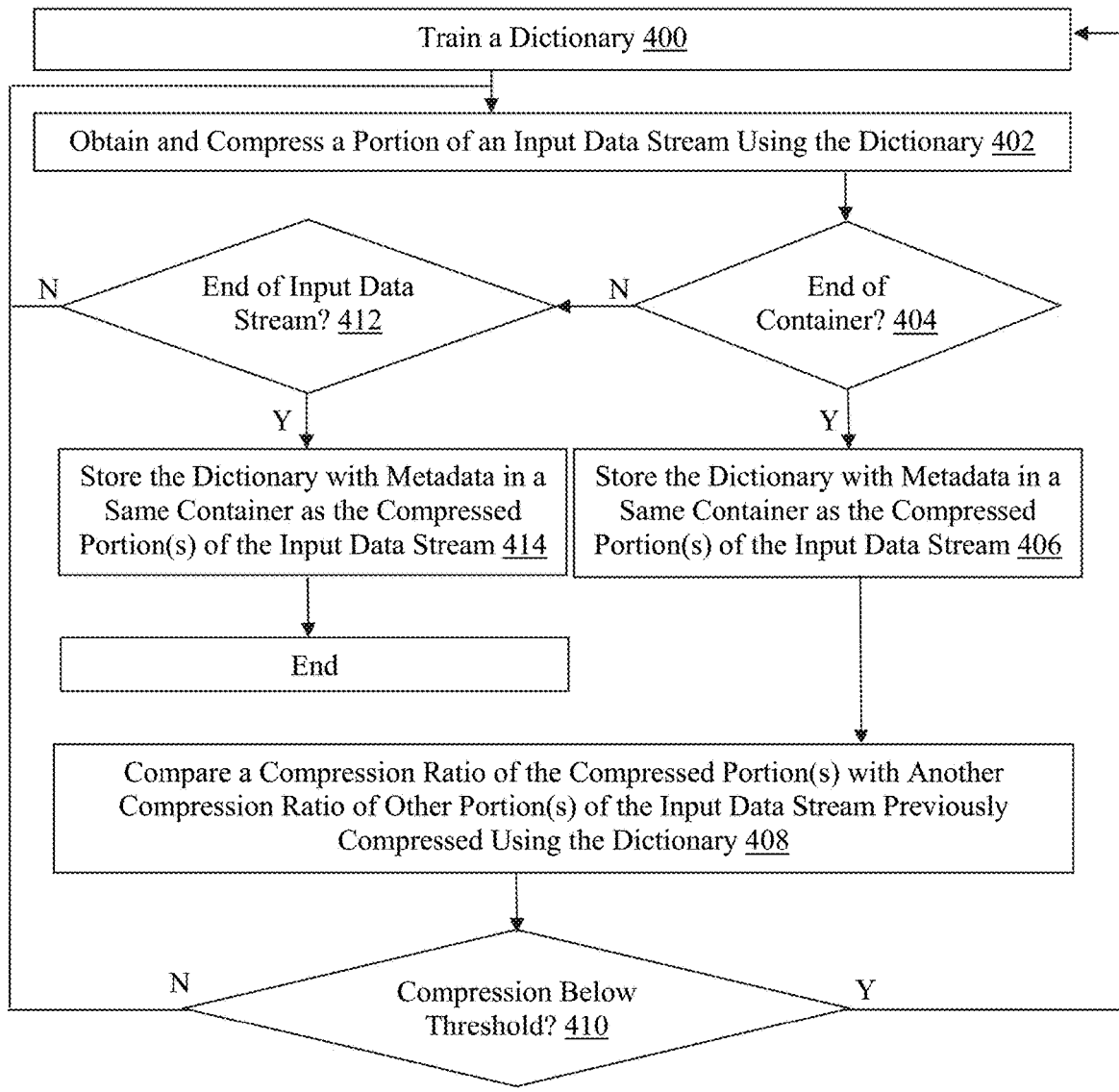
FIG. 4 is a flowchart of an exemplary method for threshold-based dynamic dictionary retraining for dictionary-based data compression.

Referring more specifically to FIG. 4, a flowchart of an exemplary method for threshold-based dynamic dictionary retraining for dictionary-based data compression is illustrated. In this example, steps 400, 402, 404, 406, 412, and 414 can be performed as described and illustrated in detail earlier with reference to steps 300, 302, 304, 306, 310, and 312 of FIG. 3, respectively. However, in step 408, subsequent to reaching the end of a container and storing the dictionary with metadata in the container with the compressed portion(s) of the input data stream, the node computing device 106(1) determines a compression ratio of the compressed portion(s) of the input data stream associated with the current container for which the end was reached in step 404.

The node computing device 106(1) then compares the determined compression ratio with a stored compression ratio of other portion(s) of the input data stream previously compressed using the dictionary trained in step 400. The previously compressed portion(s) of the input data stream can be a portion immediately prior to the current portion or an initial portion (e.g., that was used to train the dictionary), for example, which can be within the same or in a different container, although the compression ratio of other compressed portions or other data sets can also be used in other examples.

Accordingly, in step 410, the node computing device 106(1) determines whether the compression ratio determined in step 408 is below a compression threshold based on the comparison of the determined compression ratio with the stored compression ratio. The compression threshold can be fixed, configurable, or dynamic and can represent a value, percentage, or deviation level, for example, and other types of compression thresholds can also be used. A compression ratio below the threshold can indicate a relatively low and/or declining compression ratio and associated reduced effectiveness of the dictionary.

If the node computing device 106(1) determines in step 410 that the compression ratio is below the compression threshold, then the Yes branch is taken back to step 400 and a new dictionary is trained. A decreasing compression ratio in these examples is indicative of decreasing effectiveness of the dictionary such that the dictionary is becoming stale. When the compression ratio deviates or decreases by a threshold amount, the dictionary is determined to be stale and a new dictionary is trained to improve the effectiveness of the compression.

However, if the node computing device 106(1) determines in step 410 that the compression ratio is not below the compression threshold, then the No branch is taken back to step 402, and the node computing device 106(1) obtains and compresses another portion of the input data stream using the current dictionary. Optionally, the node computing device 106(1) can also replace the stored compression ratio with the compression ratio determined in step 408 in examples in which the compression ratio of an immediately prior portion is used in the comparison in step 408. In other examples, one or more of steps 400-414 can be performed in parallel for any number of input data streams and/or in a different order.

Additionally, in yet other examples, the node computing device 106(1) optionally determines whether a threshold amount of the input data stream has been compressed using the dictionary trained in step 400 before proceeding to step 408. If a threshold amount of the input data stream has not been compressed with the dictionary trained in step 400, then the node computing device 106(1) proceeds back to step 402 without performing steps 408 and 410.

However, if the threshold amount of the input data stream has been compressed with the dictionary trained in step 400, then the node computing device 106(1) proceeds to compare the compression ratios in step 408. Accordingly, in these examples, at least a threshold amount of the input data stream is compressed using a newly trained dictionary before the node computing device 106(1) switches to the threshold-based dictionary retraining described and illustrated with reference to steps 408-410 of FIG. 4 in order to determine whether to retrain a new dictionary thereby avoiding training dictionaries too frequently.

Figure 5:
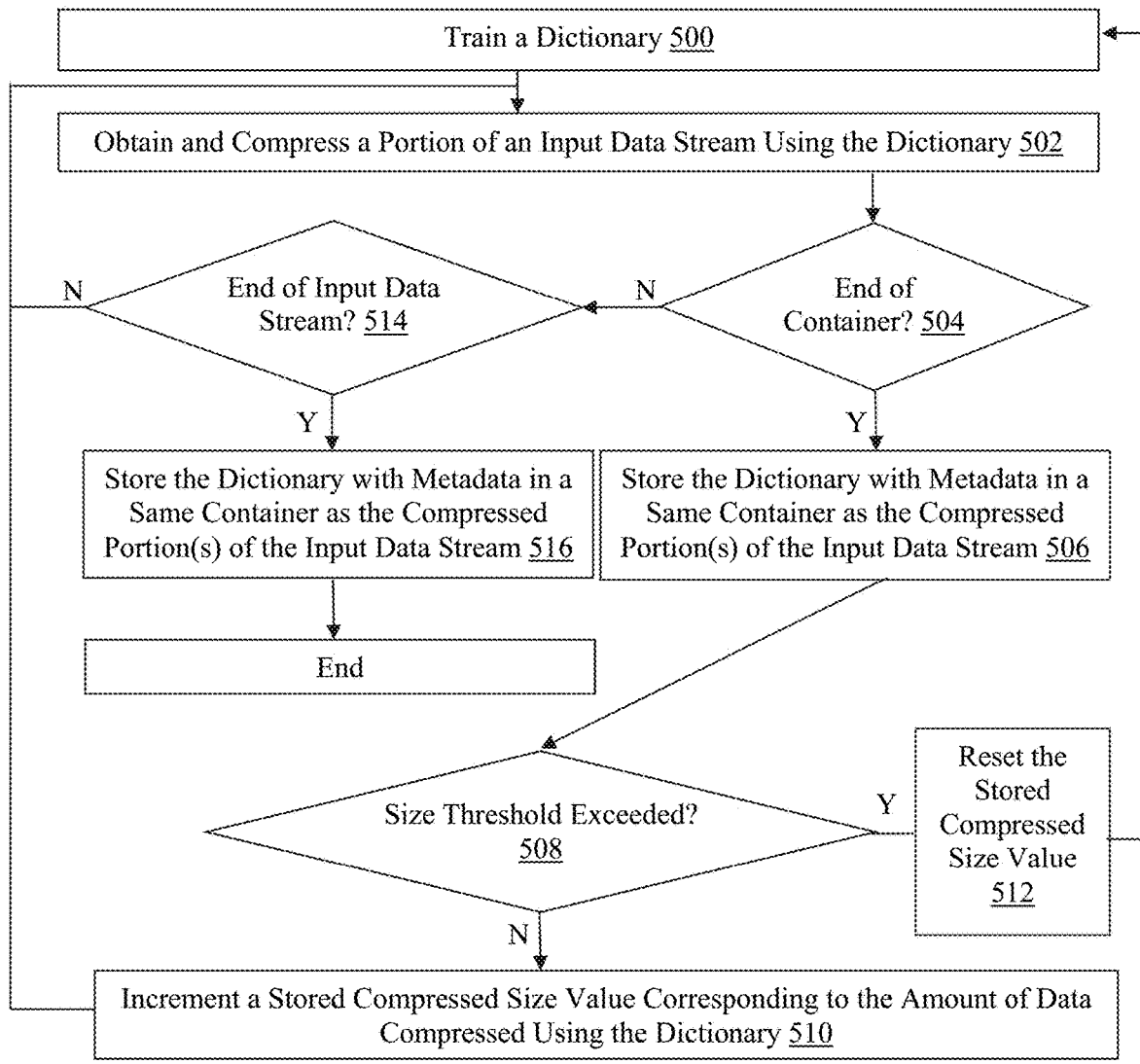
FIG. 5 is a flowchart of an exemplary method for frequency-based dynamic dictionary retraining for dictionary-based data compression.

Referring more specifically to FIG. 5, a flowchart of an exemplary method for frequency-based dynamic dictionary retraining for dictionary-based data compression is illustrated. In this example, steps 500, 502, 504, 506, 514, and 516 can be performed as described and illustrated in detail earlier with reference to steps 300, 302, 304, 306, 310, and 312 of FIG. 3, respectively. However, in step 508, the node computing device 106(1) determines whether a size or amount of data that has been compressed using the dictionary trained in step 500 exceeds a stored size threshold. The size threshold can be fixed or dynamic and can optionally correspond to the size of a number of read buffers, for example, although other types of size thresholds can also be used. If the node computing device 106(1) determines that the size threshold has not been exceeded, then the No branch is taken to step 510.

In step 510, the node computing device 106(1) increments a stored compressed size value, was compared to the size threshold in step 508, based on the size of the portion of the input data stream that was compressed in the current iteration. Accordingly, the stored compressed size value corresponds to the overall amount or size of data that has been compressed using a current dictionary. Subsequent to incrementing the stored compressed size value, the node computing device 106(1) proceeds back to step 502 and obtains and compresses another portion of the input data stream using the dictionary trained in step 500. However, referring back to step 508, if the node computing device 106(1) determines that the size threshold has been exceeded, then the Yes branch is taken to step 512.

In step 512, the node computing device 106(1) resets the stored compressed size value. Subsequent to resetting the stored compressed size value, the node computing device 106(1) proceeds back to step 500 and trains a new dictionary. Accordingly, in this example, the dictionary is retrained at regular intervals so that each dictionary is used to compress a corresponding amount of the input data stream. Other types of sizes, thresholds, and frequencies (e.g., time-based or number of compressed units/portions) can also be used in other examples. Additionally, in other examples, one or more of steps 500-516 can be performed in parallel for any number of input data streams and/or in a different order.

Figure 6:
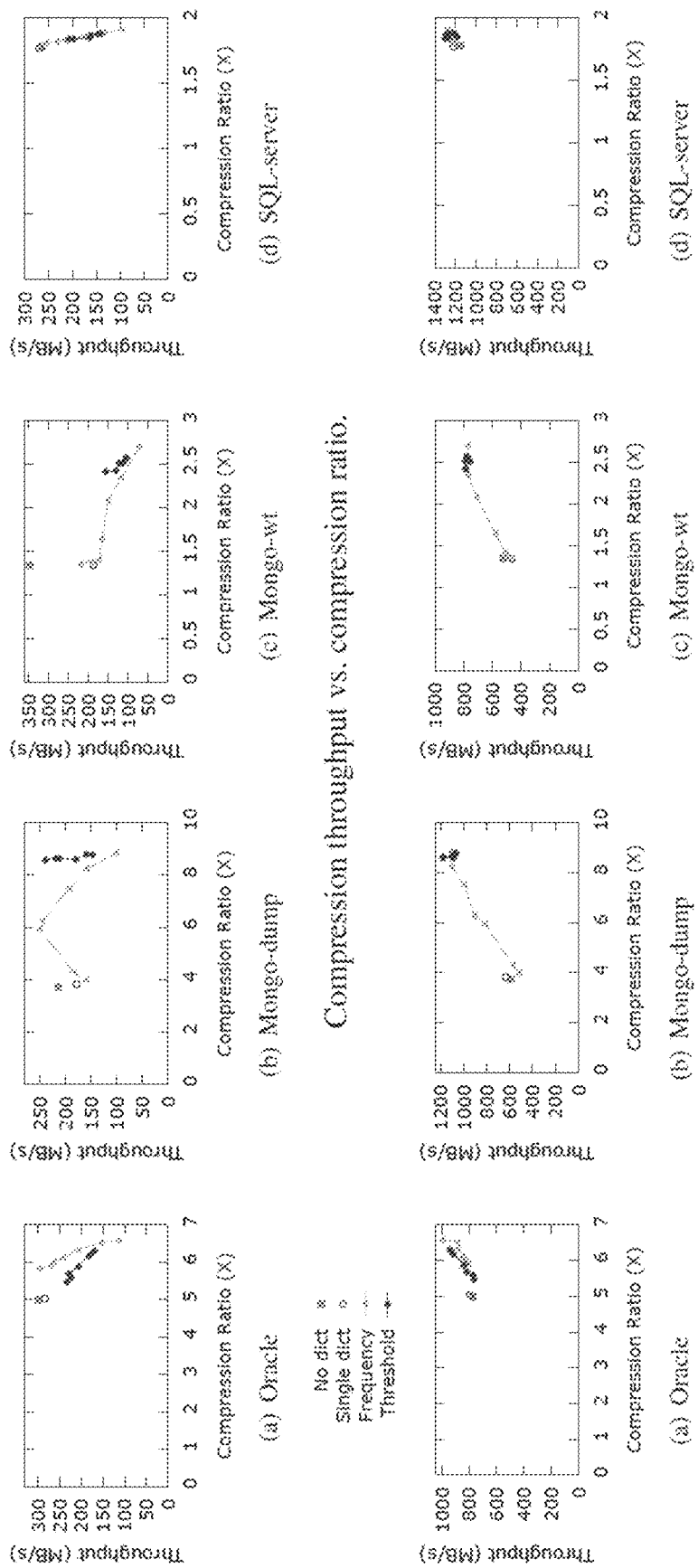
FIG. 6 is a set of graphs illustrating compression and decompression throughput and compression ratio testing results.

Referring to FIG. 6, a set of graphs illustrating compression and decompression throughput and compression ratio testing results is illustrated, by way of example of embodiments of the present disclosure. Four datasets were used in the evaluation that resulted in the graphs illustrated in FIG. 6 including (1) Oracle™, a data file from an Oracle™ database, (2) Mongodump™ and (3) an exported file and a data file in wiredtiger™ format of a MongoDB™, and (4) structured query language S(QL) server, a data file from a Microsoft™ SQL server.

The experiments were run in a server with an Intel™ Xeon™ central processing unit (CPU) E5-2620™ v4 processor and a 256 gigabyte (GB) memory. The server was installed with an Ubuntu™ 14 operating system. Zstandard™ v1.3.8 was used and each experiment was repeated three times and the average performance numbers are represented in FIG. 6. Additionally, the following parameters were used: Compression unit (KiB): 32; Number of samples: 256; Dictionary size (KiB): 128; and Compression level: 1 4.

As illustrated in FIG. 6, with dynamic dictionary retraining, the compression ratio more than doubled for Mongodump, was increased from 1.34× to 2.7× for Mongo-wt™, and, was improved from 5× to 6.6× for Oracle™, an improvement of more than 30%. The degradation in compression throughput was also significant: the throughput also dropped by 2-3× when achieving the maximum improvements in compression ratio. Additionally, for Oracle™, the compression ratio was improved from 4.991 to 5.831, when a new dictionary was retrained every 64 read buffers (every 1 GB of input data). The compression ratio was improved for Mongodump™ from 3.73× to 8.6× by using threshold-based dictionary retraining with a threshold of 0.1. When retraining a new dictionary for every 8 read buffers (every 128 MB of input data), the compression ratio was improved from 3.73× to 6.27×. In all these cases, the compression ratio was increased significantly without significantly impacting compression throughput.

Accordingly, this technology advantageously facilitates greater space saving and better backup and restore performance. Compression with a dictionary that is dynamically retrained according to the technology described and illustrated by way of the examples herein leads to better compression ratios and higher compression and decompression throughput. By storing dictionaries in containers along with the data compressed using the dictionaries, this technology also advantageously reduces storage system overhead and complexity and eliminates the need for reference counting to track data blocks compressed using a particular dictionary.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   compressing, by a computing device, a first portion of an input data stream using a first dictionary;
   storing, by the computing device, the first dictionary in a first container with first metadata associated with the compressed first portion;
   compressing, by the computing device, a second portion of the input data stream using the first dictionary when the first dictionary is not determined to be stale after the compression of the first portion using the first dictionary, wherein the second portion occurs later in the input data stream than the first portion; and storing, by the computing device, the first dictionary in a second container with second metadata associated with the compressed second portion.

2. The method of claim 1, further comprising compressing, by the computing device, the second portion of the input data stream using the first dictionary after determining a size of the input data stream that has been compressed using the first dictionary fails to exceed a threshold size.

3. The method of claim 1, further comprising training, by the computing device, the first dictionary using a second portion of the input data stream that occurs before the first portion in the input data stream.

4. The method of claim 1, further comprising training, by the computing device, the first dictionary with a sample data stream until the first dictionary reaches a threshold size.

5. The method of claim 1, further comprising training, by the computing device, a second dictionary after determining a size of the input data stream that has been compressed using the first dictionary exceeds a threshold size.

6. The method of claim 5, further comprising compressing, by the computing device, a third portion of the input data stream using the second dictionary, wherein the third portion occurs later in the input data stream than the first and second portions.

7. A non-transitory machine readable medium having stored thereon instructions for dictionary-based compression comprising machine executable code that, when executed by at least one machine, causes the machine to:
compress a first portion of an input data stream using a first dictionary;
determine when a compression ratio of the first portion fails to exceed a compression threshold; and
compress a second portion of the input data stream using a second dictionary, when the determination indicates the compression ratio fails to exceed the compression threshold.

8. The non-transitory machine readable medium of claim 7, wherein the machine executable code, when executed by the machine, further causes the machine to compress the second portion using the first dictionary, when the determination indicates the compression ratio exceeds the compression threshold.

9. The non-transitory machine readable medium of claim 8, wherein the machine executable code, when executed by the machine, further causes the machine to store the first dictionary in a first container with first metadata associated with the compressed first portion and a second container with second metadata associated with the compressed second portion.

10. The non-transitory machine readable medium of claim 7, wherein the compression threshold is based on another compression ratio of a third portion of the input data stream compressed using the first dictionary before the first portion is compressed using the first dictionary.

11. The non-transitory machine readable medium of claim 7, wherein the machine executable code, when executed by the machine, further causes the machine to train the first dictionary using a third portion of the input data stream that occurs before the first portion in the input data stream.

12. The non-transitory machine readable medium of claim 7, wherein the machine executable code, when executed by the machine, further causes the machine to train the second dictionary, when the determination indicates the compression ratio fails to exceed the compression threshold.

13. The non-transitory machine readable medium of claim 7, wherein the machine executable code, when executed by the machine, further causes the machine to store the first dictionary in a first container with first metadata associated with the compressed first portion.

14. A computing device, comprising:
a memory containing machine readable medium comprising machine executable code having stored thereon instructions for dictionary-based compression; and
a processor coupled to the memory, the processor configured to execute the machine executable code to cause the processor to:
compress a first portion of an input data stream using a first dictionary;
determine when a compression ratio of the compressed first portion is below a compression threshold based on a comparison of the compression ratio with another compression ratio of a compressed second portion of the input data stream, wherein the second portion is compressed using the first dictionary; and
train a second dictionary, when the determination indicates the compression ratio is below the compression threshold.

15. The computing device of claim 14, wherein the processor is further configured to execute the machine executable code to further cause the processor to train the first dictionary using a third portion of the input data stream that occurs before the first and second portions in the input data stream.

16. The computing device of claim 15, wherein the third portion comprises an initial portion of the input data stream.

17. The computing device of claim 14, wherein the processor is further configured to execute the machine executable code to further cause the processor to store the first dictionary in a container with metadata associated with the compressed first portion, when the determination indicates the compression ratio is below the compression threshold.

18. The computing device of claim 14, wherein the second portion occurs before the first portion in the input data stream.

19. The computing device of claim 18, wherein the second portion occurs immediately prior in the input data stream to the first portion.

20. The computing device of claim 14, wherein the processor is further configured to execute the machine executable code to further cause the processor to train the second dictionary using a third portion of the input data stream that occurs later in the input data stream than the first and second portions.

* * * * *